Patented Feb. 24, 1953

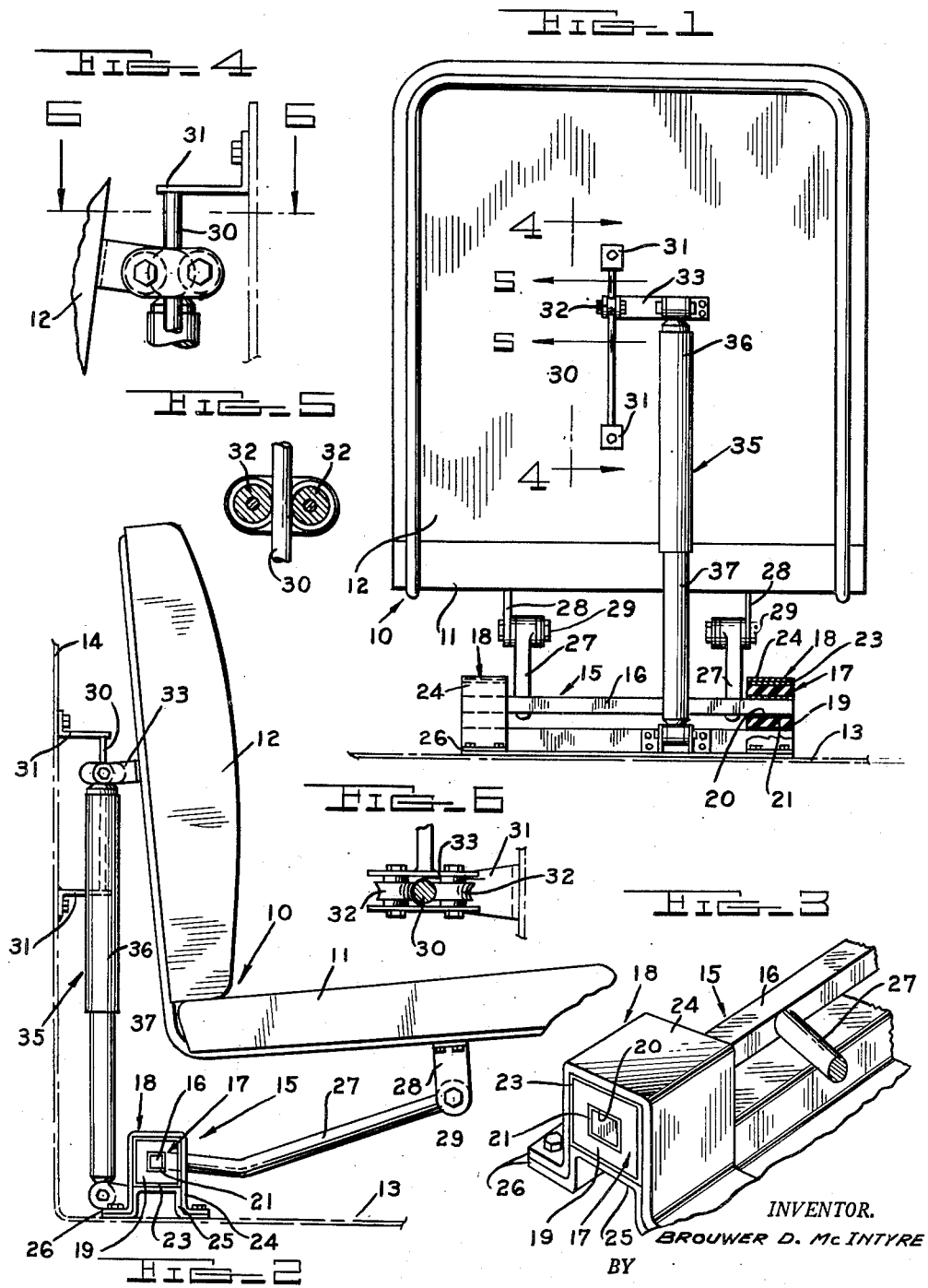

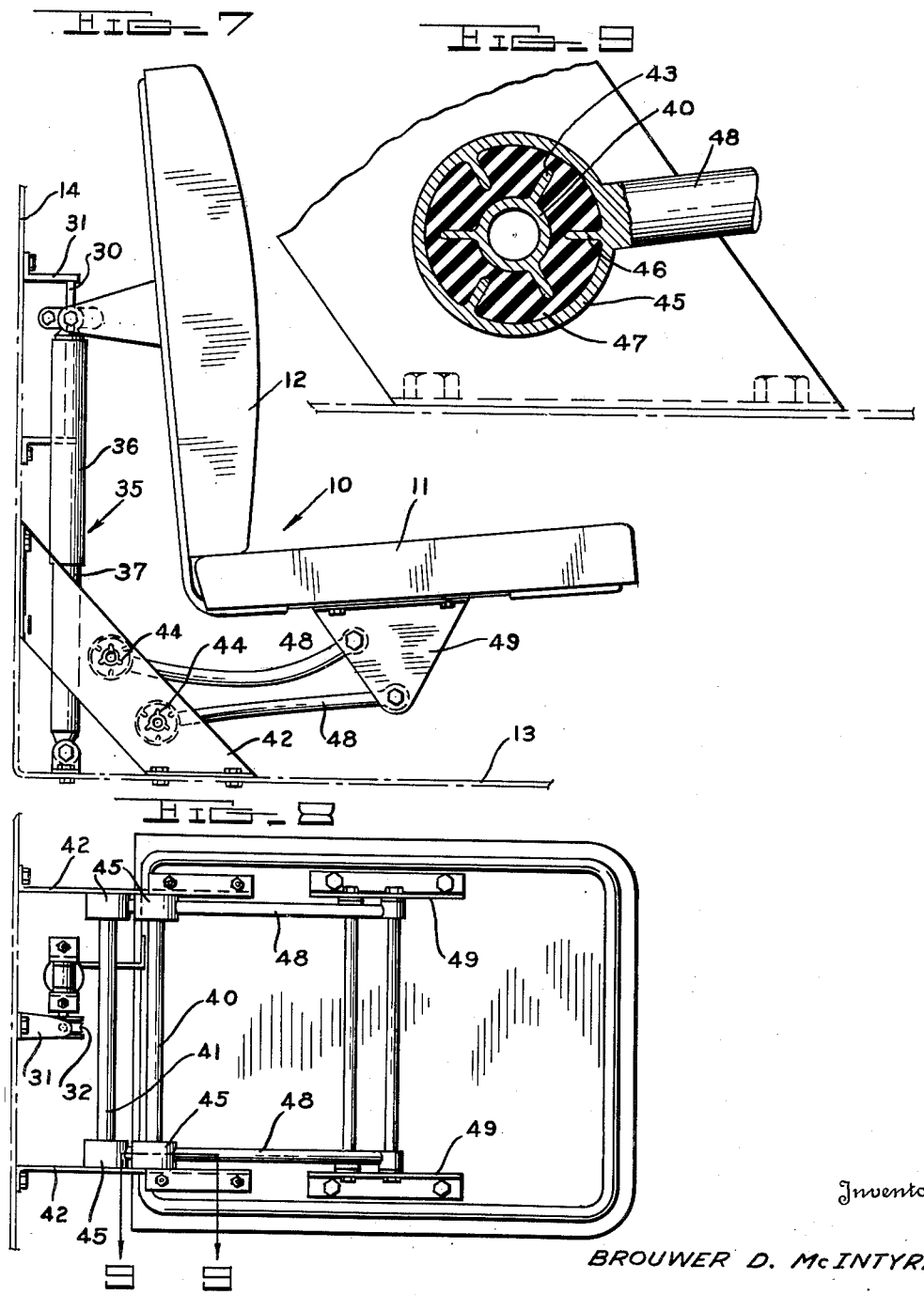

2,629,427

UNITED STATES PATENT OFFICE 2,629,427

SEAT CONSTRUCTION

Brouwer D. McIntyre, Monroe, Mich., assignor to Monroe Auto Equipment Company, Monroe, Mich., a corporation of Michigan Application July 24, 1946, Serial No. 686,030

2 Claims. (Cl. 155—9)

This invention relates generally to seat constructions and refers more particularly to improvements in seat assemblies for use in connection with vehicles, boats and the like.

In the manufacture of certain types of vehicles, such for example, as trucks, buses or tractors, it is essential to design the chassis or spring suspension system with load factors as a primary consideration, so that such vehicles usually afford very little comfort to passengers or to the operator. In order to improve the riding qualities of such vehicles, it has been propsed to provide seat assemblies supported on the sprung unit of the vehicle through springs, and in some cases, a double acting hydraulic shock absorber is provided for controlling the action of the springs.

While seats of the above general type have greatly improved the riding qualities of such vehicles, nevertheless, they are costly to manufacture and install. This is especially true in instances where the seat assemblies also embodied means for maintaining the seat on an even keel during spring deflection.

With the above in view, it is one of the objects of this invention to provide a seat assembly possessing all of the advantages of spring supported seats insofar as riding comfort is concerned and, at the same time, composed of a fewer number of parts capable of being inexpensively manufactured, assembled and installed.

Another object of this invention is to provide a seat assembly wherein the usual coil springs are replaced by torsional bushings forming a part of the unit for maintaining the seat on an even keel.

A further object of this invention is to provide supporting means for the seat embodying blocks of rubber, synthetic rubber or such resilient compounds which are capable of distortion by reason of their inherent physical properties upon vertical movement of the seat in either direction. The arrangement is such that vertical movement of the seat is yieldingly accommodated by distortion of the resilient blocks and accordingly the latter perform the further function of damping seat movement.

Still another object of this invention is to incorporate a double acting hydraulic shock absorber in the seat assembly to prevent "pitching" of the seat and otherwise control the movement thereof induced by force reactions transmitted to the sprung unit of the vehicle by the unsprung unit as it passes over uneven road surfaces.

The foregoing as well as other objects will be made more apparent as this description proceeds, especially when considered in connection with the accompanying drawings, wherein:

Figure 1 is an elevational view, partly in section, of the rear side of a seat assembly constructed in accordance with this invention;

Figure 2 is a side elevational view of the construction shown in Figure 1;

Figure 3 is a fragmentary perspective view of a part of the seat assembly;

Figure 4 is a longitudinal sectional view taken substantially on the line 4—4 of Figure 1;

Figure 5 is a sectional view taken on the plane indicated by the line 5—5 of Figure 1;

Figure 6 is a sectional view taken on the plane indicated by the line 6—6 of Figure 4;

Figure 7 is a side elevational view of a modified form of seat assembly;

Figure 8 is a bottom plan view of the construction shown in Figure 7; and

Figure 9 is a cross sectional view taken substantially on the plane indicated by the line 9—9 of Figure 8.

Referring first to the embodiment of the invention shown in Figures 1 to 6 inclusive, it will be noted that the reference character 10 indicates a seat assembly comprising a seat portion 11 and a back portion 12 suitably fixed with respect to the seat portion 11. The seat 11 is supported in an elevated position with respect to a horizontal fixed part 13 and the back portion 12 is spaced laterally from a fixed vertical support 14. The horizontal support 13 may comprise the flooring of a truck body and the vertical support 14 may be considered the rear wall of the truck cab.

In any case, the seat assembly 10 is supported above the flooring 13 by a unit 15 forming a part of the seat assembly and secured to the flooring 13 below the seat 11 adjacent the rear side of the latter. The unit 15 comprises a shaft 16, torsional bushings 17 and brackets 18. The shaft 16 extends transversely of the seat 11 and is polygonally shaped in cross section. The opposite ends of the shaft 16 are mounted upon the support or flooring 13 by the torsional bushings 17 and brackets 18. Each torsional bushing 17 comprises a block of resilient material 19 preferably formed of rubber, synthetic rubber or such resilient compounds which are capable of distortion by reason of their inherent physical properties. As shown particularly in Figure 3 of the drawings, each resilient block 19 is formed with a polygonally shaped opening 20 therethrough and a bushing 21 of corresponding cross sectional contour is inserted into the opening 20. The opening 20 and the bushing 21 have a cross sectional contour which corresponds to the cross sectional contour of the shaft 16 for receiving the latter.

Each resilient block 19 is also enclosed in a polygonally shaped casing 23, and this casing is clamped to the support or flooring 13 by one of the brackets 18. The brackets 18 are identical in construction and comprise two sections 24 and 25. The section 24 is substantially channel-shaped in cross section and is adapted to receive the casing 23 of the adjacent torsional bushing 17. The section 25 is also channel-shaped in cross section and extends into the channel of the section 24 to engage the bottom wall of the casing 23. Both sections are provided with laterally outwardly extending attaching flanges 26 and these flanges are bolted or otherwise fixedly secured to the flooring 13. It follows from the above that the shaft 16 is not only prevented from rotation relative to the torsional bushings 17, but the latter are also prevented from rotation with respect to the brackets 18.

The shaft 16 is connected to the bottom of the seat 11 by a pair of arms 27 rigidly secured to the shaft 16 at points spaced longitudinally of the shaft and having the free ends pivotally connected to the bottom of the seat 11 adjacent opposite sides of the latter by brackets 28. The brackets 28 are secured to the side of the seat 11, and are respectively pivotally connected to the free ends of the arms 27 by pins 29. It follows from the above that the torsional bushings 17 constitute the primary means for supporting the seat assembly in an elevated position with respect to the flooring 14, and the resilient blocks 19 are capable of sufficient distortion to yieldingly permit vertical displacement of the seat assembly relative to the flooring 13. It will further be noted that the shaft 16 acts as a stabilizer and tends to maintain the seat 11 on an even keel, regardless of the load distribution on the seat.

Vertical displacement of the seat assembly is guided to assure movement of the seat assembly in a subtantially straight line path of travel. As shown particularly in Figures 4 to 6 inclusive, the guiding means comprises a vertical rod 30 having the opposite ends secured to the support 14 by brackets 31. The rod is engaged intermediate the ends by a pair of rollers 32 positioned at diametrically opposite sides of the rod and rotatably supported on a bracket 33. The bracket 33 is rigidly secured to the seat back 12 intermediate the top and bottom sides thereof in the manner shown in Figure 1 of the drawings.

Although the characteristics of the torsional bushings are such as to exert some damping action on vertical seat displacement, nevertheless, it is desired to further control this movement of the seat assembly. For accomplishing this result, a shock absorber 35 is provided. Any one of a number of different types of shock absorbers may be used to control vertical movement of the seat, and particularly satisfactory results have been obtained by employing a shock absorber of the direct acting tubular type shown in the Becker et al. Patent No. 2,078,364 dated April 27, 1937. The specific construction of the shock absorber forms no part of the present invention, and accordingly, it will suffice to point out that the relatively movable parts 36 and 37 of the shock absorber are respectively pivotally connected to the bracket 33 on the seat back 12, and to the support or flooring 13. As a result of the shock absorber, "pitching" of the seat assembly is prevented, and superior riding qualities are obtained.

Referring now to the embodiment of the invention shown in Figures 7 to 9 inclusive, it will be noted that the seat assembly is similar to the one previously described insofar as the seat 11 and back 12 are concerned. Also the means for guiding vertical movement of the seat and the means for controlling this movement may be the same as the corresponding means previously described and are therefore indicated by the same reference characters. The means for supporting the seat for vertical movement differs from the supporting unit described above, and will now be described in detail. As shown particularly in Figures 7 and 8, a pair of shafts 40 and 41 extend transversely of the seat 11 beyond the rear side of the latter. The opposite ends of the shafts are non-rotatably supported on a pair of plates 42 having the opposite ends respectively fixed to the flooring 13 and to the vertical support 14. The shafts are held from rotation relative to the plates by vanes 43 which project radially outwardly from opposite ends of the shafts in equal spaced relationship circumferentially of the shafts and engage in corresponding slots 44 formed in the plates 42. Supported at each end of the shafts in concentric relation thereto is a bushing 45 having radially inwardly extending vanes 46. The vanes 46 correspond in number and spacing to the vanes 43 and project between the latter in the manner clearly shown in Figure 9 of the drawings. The internal diameter of the bushings 45 is substantially greater than the external diameter of the shafts, and blocks of resilient material 47 are inserted in the bushings 45 to hold the shafts in concentric relation to the bushings.

An arm 48 is rigidly secured to each bushing 45 and the free ends of the arms are pivotally connected to the bottom of the seat 11 by brackets 49. The above construction is such that vertical displacement of the seat 11 is resisted by the resilient blocks 47. In other words, the bushings 45 tend to rotate relative to the shafts upon vertical movement of the seat 11 and this rotation is resisted by the resilient material disposed between the vanes 43 and 46 on the shafts and bushings respectively. However, the blocks are capable of sufficient distortion to permit the required vertical displacement of the seat to provide satisfactory riding conditions. It will also be noted that the arrangement of the arms 48 shown in Figure 7 of the drawings assists in guiding vertical movement of the seat.

What I claim as my invention is:

1. A seat assembly comprising a seat member, means supporting the seat member in an elevated position with respect to a fixed support and for movement in a generally vertical direction relative to the fixed support, said means including a pair of shafts extending transversely of the seat in parallel relationship and fixed against rotation, circumferentially spaced vanes projecting radially outwardly from and rigid with opposite ends of the shafts, sleeves respectively receiving opposite end portions of the shafts and having vanes extending inwardly between the vanes of the shafts, a pair of arms respectively rigid with the sleeves at opposite ends of one shaft and having their free ends freely pivotally connected to the seat for pivotal movement about a common axis, a second pair of arms respectively rigid with the sleeves at opposite ends of the other shaft and having their free ends connected to the seat for pivotal movement about a common axis spaced from and parallel to the axis of the pivotal movement of said first arms, resilient members disposed between said sleeves and shaft ends, each of said resilient members having recesses therein in which the vanes of said sleeves and shaft ends are received so as to prevent rotative shifting of each bushing with respect to said vanes, said bushings constituting the primary resilient supporting means for the seat and being yieldable to permit limited vertical movement of the seat, said vanes on said shafts engaging surfaces on said fixed support to prevent rotation of said shafts relative to said supports.

2. A seat assembly comprising a seat structure including a seat member and laterally spaced arms connected therewith, means freely pivotally connecting one end of each arm to said seat member, a shaft extending transversely of the seat member beneath the latter, means for supporting said shaft on a fixed support, the opposite ends of said arms being supported on said shaft, means including resilient elements yieldably connecting said arms with said shaft supporting means, said elements having surfaces engaging complementary surfaces on said arms, as well as surfaces rigid with said shaft supporting means, said arm and said surfaces rigid with said supporting means and said element surfaces being so shaped and interengaged as to prevent rotative shifting of said element surfaces with respect to said supporting means and arm surfaces so that movement of the seat is yieldably accommodated by distortion of the resilient elements, and means for limiting movements of said seat to a substantially vertical direction, said elements constituting the primary resilient means supporting said seat structure above a fixed support and being yieldable to permit limited vertical movement of the seat structure relative to a fixed support.

BROUWER D. McINTYRE.

REFERENCES CITED

The following references are of record in the file of this patent:

UNITED STATES PATENTS

| Number | Name | Date |
|---|---|---|
| 131,671 | Eils | Sept. 24, 1872 |
| 1,775,517 | Flintermann | Sept. 9, 1930 |
| 1,780,727 | Tenney | Nov. 4, 1930 |
| 1,919,033 | Noble | July 18, 1933 |
| 1,929,023 | Hickman | Oct. 3, 1933 |
| 1,973,178 | Sass | Sept. 11, 1934 |
| 2,073,872 | Kliesrath | Mar. 16, 1937 |
| 2,187,923 | Winkleman | Jan. 23, 1940 |
| 2,334,922 | Gustafson | Nov. 23, 1943 |

FOREIGN PATENTS

| Number | Country | Date |
|---|---|---|
| 556,818 | France | Apr. 20, 1923 |
| 772,751 | France | Aug. 20, 1934 |